Nov. 19, 1968  N. R. WALLIS  3,412,198
ELECTROLYTIC CONDUCTOR
Filed March 18, 1965  2 Sheets-Sheet 1

INVENTOR
NEIL RUDOLPH WALLIS

By Shoemaker and Mattare
Attys.

Nov. 19, 1968  N. R. WALLIS  3,412,198
ELECTROLYTIC CONDUCTOR
Filed March 18, 1965  2 Sheets-Sheet 2

INVENTOR
NEIL RUDOLPH WALLIS
By Shoemaker and Mattare
ATTYS.

United States Patent Office 3,412,198
Patented Nov. 19, 1968

3,412,198
ELECTROLYTIC CONDUCTOR
Neil Rudolph Wallis, Cariad, Goring-on-Thames,
Oxfordshire, England
Filed Mar. 18, 1965, Ser. No. 440,750
Claims priority, application Great Britain, Sept. 26, 1964,
39,302/64; Dec. 5, 1964, 49,577/64
10 Claims. (Cl. 174—9)

ABSTRACT OF THE DISCLOSURE

An electrolytic conductor for supplying electric current from a high voltage direct current source to a utilisation device such as a manually held electrostatic spray painting gun, said conductor comprising a flexible tube containing a solution of a metal salt in a composition comprising a major proportion of glycerine and a minor proportion of water. The flexible tube is sealed at each end by a plug and an electrode consisting of the metal of the salt contained in the electrolyte is fitted into the inner end of each plug.

Figure 1:
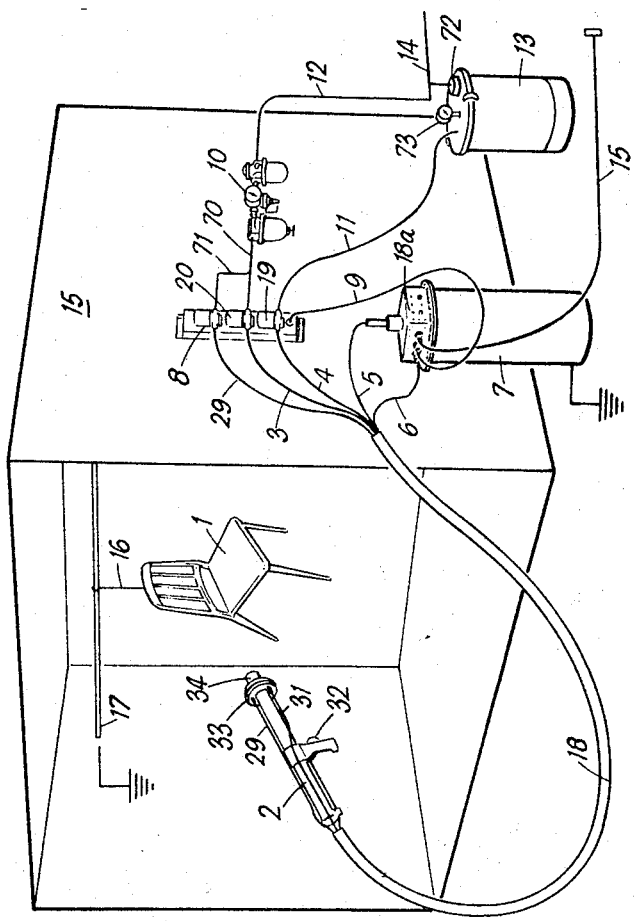
Figure 3:
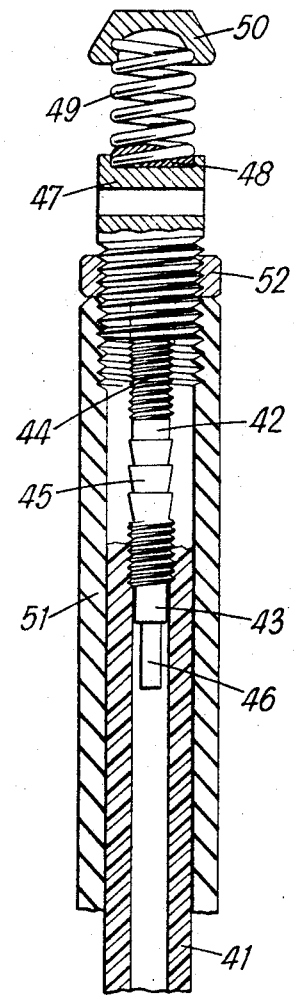

This invention relates to electrical apparatus and it is an object of the invention to provide improved means for connecting a source of high-voltage direct-current electricity to a utilisation device.

The invention consists in a method of, or means for, supplying electric current from a high-voltage direct-current source to a utilisation device, wherein said current is supplied by electrolytic conduction through a liquid or gel contained in a flexible tube extending between said source and said device.

The invention also consists in electrical apparatus, including a source of high-voltage direct-current electricity connected to a utilisation device by means of a conductive element, wherein said conductive element includes a flexible tube of liquid-tight material containing a non-conductive liquid or gel in which is dissolved a metal salt, wherein said tube is sealed at each end by means of a cap or plug consisting of, or including a portion of, the metal of said salt in contact with said liquid or gel, and wherein one of said caps or plugs is electrically connected to said source and the other cap or plug is electrically connected to said device.

The term "high-voltage direct-current source" is used herein to include any device capable of producing a potential difference of more than 10 kilovolts between its output terminals, said potential difference being substantially steady. Most practical D.C. generators produce an output having at least a small A.C. component or ripple and the term is, of course, intended to include such generators.

One terminal of the source and one terminal of the device will normally be earthed and the circuit will be completed by interconnecting their other terminals through an electrolytic conductor in accordance with the invention.

Preferably the flexible tube contains a viscous non-conductive liquid which may be, for example, glycerine. The salt dissolved in the liquid may be, for example, copper sulphate, and in this case at least a part of each cap or plug that is in contact with the liquid consists of copper. Suitable materials for the flexible tube are readily available and one of these is, for example, polyethylene.

The invention is particularly applicable to electrostatic paint spraying apparatus, but is not limited to such applications since it may well be advantageous to utilise the principle of the invention in other electrical apparatus in which analogous problems arise.

The invention also consists in electrostatic spray coating apparatus including a gun and a high-voltage direct-current source interconnected by means of an electrolytic conductor.

In electrostatic paint spraying apparatus, the voltages used are normally of the order of 100,000 volts and the use of such high voltages gives rise to a number of problems, particularly when it is desired that the gun should be manually held. The term "gun" is used herein to describe any form of device for atomising paint and projecting the atomised paint into an electrostatic field. Normally, the article to be painted is at earth potential and the gun is connected to the high-voltage terminal of an electrostatic high-voltage generator by means of a cable. In order to reduce the risk of shock to the operator and also to reduce the fire hazard, it has been normal practice to use a high-voltage generator having a high internal impedance so that the output voltage of the generator drops if the current drain from the generator is increased. The use of a high-impedance generator does reduce the current available at the gun to cause a discharge between the gun and an earthed object. However, the gun and the cable connecting the gun to the high-voltage generator act like a capacitor to store an electric charge, and under certain circumstances the charge stored may be sufficient to create a fire hazard or a risk of a dangerous shock to an operator. Accordingly, it has in the past been the practice to include a resistor in the gun between the cable and the parts from which the atomised paint is projected. This resistor serves to reduce the current available from the capacitor constituted by the cable so that it is only the capacitance of those parts of the gun beyond the resistor that constitutes a possible cause of an objectionable discharge. However, the provision of a resistor in the gun has a number of disadvantages. One disadvantage is that for use at the high voltages involved in electrostatic paint spraying a resistor having a high-ohmic resistance must be of a considerable length if it is to be effective. Consequently, it has been necessary to make the guns inconveniently long in order to accommodate the required resistors. A further disadvantage is that the value of any suitable resistors so far available is difficult to control both in manufacture and in use. Further the life of these resistors tends to be somewhat limited in many cases.

In view of the above disadvantages of using a resistor in the gun, experiments were undertaken to find a suitable resistor which could be incorporated in the cable between the gun and the high-voltage generator. The resistance required in an electrostatic paint spraying system between the gun and the high-voltage generator is at least 100 megohms and, in view of this high value and the high voltages also involved, it is desirable that the length of the resistor used should be as great as possible. Thus, it would have been very convenient to use the whole length of the cable between the generator and the gun as the resistor. However, the experiments conducted by the inventor led to the conclusion that no presently available resistive elements could be satisfactorily used in this way, but it was found that the use of electrolytic conduction provided a satisfactory solution to all the problems involved.

The requirements to be met by the liquid or gel are that its electrical conductivity should be very low, that it should be stable and unaffected by high voltages or changes in temperature and that it should be a suitable solvent for the metal salt used to provide the electrolytic conductivity. It has been found that a viscous liquid is the most convenient form to use and one such liquid which has been found suitable is glycerine. The salt used may be a salt of any metal which is convenient for use in the end caps or plugs. The caps or plugs themselves need not necessarily consist of the metal of which the salt is dissolved in the liquid but may, if desired, be provided with electrodes consisting of this metal. One salt which has been found suitable is copper sulphate and in this case copper electrodes have been satisfactorily used, screwed on the end of brass plugs. The amount of salt to be used in the solution will depend on the current which the source is required to supply to the utilisation device, but will normally be between 5 and 10 grams per litre of solution.

Figure 2:
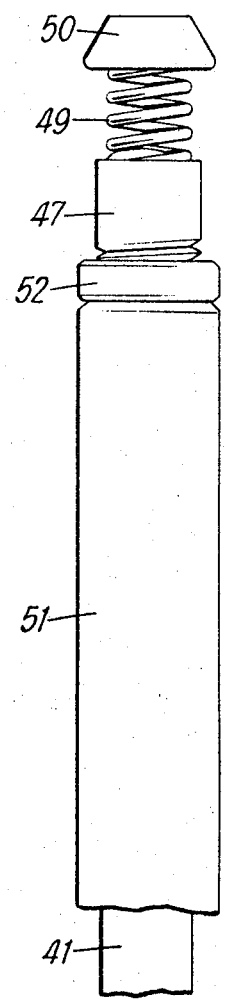

It has been found in practice that the water content of glycerine is liable to vary in different samples and, accordingly, in order to ensure that results are reproducible, it is desirable to add a controlled amount of water to the glycerine. In general it has been found that the water content should be between 10 and 20 percent. For most applications in the field of electrostatic spray painting where the length of the electrolytic conductor is between 7 and 15 metres, it may be stated that, if the water content is less than 20% the weight of copper sulphate must be more than 5 grams per litre and that, if the weight of copper sulphate is less than 10 grams per litre, the water content must be more than 13.5%.

In many cases, variations in the volume of the liquid with temperature will be capable of being absorbed by the expansion and contraction of the tube. However, in some circumstances, it may be preferable to include special means for accommodating changes in volume due to temperature. Such special means may, for example, consist of an expansion joint in the tube or a pocket of air or other compressible medium sealed within the tube. In the latter case, the compressible medium may be contained, for example, in a liquid-tight container which must be of such dimensions that it does not interrupt the continuity of the liquid column in the tube. Nor must it reduce the volume of the column of liquid sufficiently to cause any undue increase of temperature under operating conditions. For this reason it may be desirable to increase the diameter of the tube at the point where the container for the compressible medium is included.

In one particular embodiment of the invention an inner tube having an outer diameter about one half the inner diameter of the flexible tube is inserted in the flexible tube and extends throughout its length. The inner tube contains air and is sealed in an air-tight fashion at each end.

An insert in the flexible tube may also be desirable for the purpose of preventing kinking and to prevent damage if the tube is subjected to external pressure; for example, as a result of the passage of a heavy vehicle over it. In such cases, the insert may be in the form of a solid nylon core or may consist of glass fibre strands extending along the interior of the tube from one end thereof.

The ends of the flexible tube may be externally threaded to co-operate with corresponding threads on metal caps. Further, the bore of the tube may be tapered at the ends and metal plugs may be provided to seal the tube when they are forced into the tapered portions by tightening of the respective caps. However, in a preferred embodiment, each plug consists of an inner, threaded portion which is self-tapping in the bore of the flexible tube and an outer portion having a multiple taper designed to produce an effective seal when the plug is drawn into the flexible tube by means of the inner threaded portion. Any suitable terminal arrangement may be provided at the free end of the plug and this may, for example, consist of a further threaded portion to which may be screwed a suitable adapter.

Some of the advantages of the invention are as follows:

(1) It eliminates the problem of cable capacitance, thus making very short hand guns possible; for example, the gun may be six inches long instead of the usual two or three feet.

(2) It is possible to obtain very accurate control of the conductivity by varying the amount of salt dissolved in the liquid or gel.

(3) An electrolytic conductor in accordance with the invention is very stable in performance and there is very little risk of an open circuit except in the case of actual mechanical rupture of the tube. The risk can be minimised by use of a sufficiently strong tube.

One method of performing the invention will now be described with reference to the accompanying diagrammatic drawings, in which FIGURE 1 illustrates a complete electrostatic paint spraying installation and, FIGURES 2 and 3 illustrate one end of an electrolytic conductor in accordance with the invention, FIGURE 2 being a side elevation and FIGURE 3 a sectional side elevation.

The installation illustrated in FIGURE 1 includes a manual electrostatic spray gun which is used in a spraying booth 15. The article to be coated is exemplified by a chair 1 which is earthed by means of a metal hook 16 which connects the chair to an earthed rail 17. The gun is connected to the remainder of the apparatus by means of a multiple cable 18 which includes an air line 3 for the motor, a paint line 4, an electrolytic conductor 5 for the high voltage supply, a trigger control cable 6, and a further air line 29.

The trigger control cable 6 connects a microswitch operated by a trigger 32 to the control equipment **18*a* which is mounted on a high voltage generator 7, the container for which is connected to earth. The control equipment and the high voltage generator are connected to the mains supply by means of a mains cable 15. The control equipment is connected by means of an interconnecting cable 9 to a bank of three remote controlled valves 19, 20 and 8. The valve 19 connects the paint line 4 through a further paint line 11 to a supply of paint in a container 13. The valve 20 connects the air line 3 for the motor through a line 70, a combined moisture separator automatic lubricator and atomiser control 10 and a further air line 12 to a main air supply inlet 14. The valve 8 connects the air line 29 through a further air line 71 to a junction in the air line 70**.

The air supply inlet 14 is also connected through a reducing valve 72 to the interior of the paint container 13 so that paint is supplied to the line 11 under pressure.

The gun 2 includes a shroud 33 surrounding a rotating cup 34. The arrangement of the control circuit **18*a*, is such that when the trigger on the gun is pressed air is supplied under pressure to the shroud and also to a motor to cause the cup 34 to revolve. When the cup is revolving at a sufficient speed, the paint valve 19 is opened so that paint is supplied under pressure to the cup 34. Centrifugal force causes the paint to travel towards the tapered forward edge of the cup and the paint is atomised from this edge. The paint is charged by the electrostatic field and is consequently attracted towards the article to be coated since this is the nearest object at earth potential. Jets of air issuing from the shroud assist the electrostatic field in producing an even deposition of the paint on the article 1**.

The high voltage output terminal of the generator 7 is connected to the gun 2 by means of an electrolytic conductor 5 in accordance with the invention. This conductor includes a flexible nylon or polyethylene tube 41 (FIGURE 2) having a length of 7 metres and an internal cross-sectional area of 0.3 square centimetre. The working voltage of the high voltage generator is 100 kilovolts and the electrolytic conductor is designed so that the short-circuit current cannot exceed 100 microamps. The normal working current when the apparatus is in use is of the order of 25 microamps.

The tube 41 contains a mixture of glycerine and water in which copper sulphate is dissolved. Some examples of proportions which may be used are given in the following table:

| Copper sulphate per litre of solution, wt. gms. | Water, percent |
|---|---|
| 5 | 16 |
| 7 | 15 |
| 9 | 14 |

Each end of the electrolytic conductor is provided with a terminal arangement as illustrated in FIGURE 2. This terminal arrangement includes a tapered plug 42 inserted in the bore of the tube 41. The plug 42 includes an inner threaded portion 43 and an outer threaded portion 44 connected by a portion 45 provided with three tapered sections. The plug is drawn into the bore of the tube 41 by means of the inner threaded portion 43 which is self-tapping in the tube. The multiple tapered portion 45 is designed to produce an effective seal when the plug is drawn into the tube. The plug consists of brass and the inner end of the portion 43 is provided with a threaded bore to receive a copper electrode 46. An adapter 47 which is screwed on to the outer end of the threaded portion 44 of the plug is provided with a recess 48 in which one end of a spring 49 is secured by silver soldering. A contact member 50 is secured also by silver soldering to the other end of the spring 49. The end of the flexible tube 41 is covered by a length of rigid tube 51 which may, for example, consist of polyvinyl chloride. This rigid tube is provided with an internal thread at one end to co-operate with an external thread on the adapter 47. The rigid tube is secured in position on the adapter by means of a locking nut 52.

The adapter at one end of the conductor is secured to the gun by means of its external thread and is locked in position by means of the locking nut 52. The adapter is screwed far enough into the gun to compress the spring 49 so that a good contact is ensured. Similarly, the adapter at the other end of the conductor is screwed into the high-voltage terminal on the generator 7.

In the embodiment described, the flexible tube 41 is of constant cross-section throughout its length. In some circumstances, however, it may be desirable to use a tube having a wall thickness which decreases along the length of the tube, being greatest in the immediate vicinity of the generator where the tendency for a discharge to take place between the electrolyte in the tube and an earthed object outside the tube would be greatest, and least in the vicinity of the gun where it is desirable that the conductor should be as light as possible.

What I claim as my invention and desire to secure by Letters Patent of the United States is:

1. An electrolytic conductor for supplying electric current from a high-voltage direct-current source to a utilisation device, said conductor comprising a flexible tube containing a solution of a metal salt in a composition comprising a major proportion of glycerine, a plug sealing each end of said flexible tube and an electrode fitted into the inner end of each plug and consisting of the metal of said salt.

2. An electrolytic conductor according to claim 1, wherein the flexible tube contains a solution of copper sulphate in a mixture comprising a major proportion of glycerine and a minor proportion of water, wherein each plug consists of brass, and wherein each electrode consists of copper.

3. An electrolytic conductor according to claim 1, wherein the length of the flexible tube is between 7 and 15 metres, wherein the cross-sectional area of the interior of the flexible tube is between 0.2 and 0.4 square centimetre, wherein the solution contains between 5 and 9 grams of copper sulphate per litre, and wherein the water content of the solution is between 14 and 20%.

4. An electrolytic conductor according to claim 3, wherein the solution contains 5 grams of copper sulphate per litre, and wherein the water content of the solution is between 16% and 20%.

5. An electrolytic conductor according to claim 3, wherein the solution contains 7 grams of copper sulphate per litre, and wherein the water content of the solution is between 15 and 18%.

6. An electrolytic conductor according to claim 3, wherein the solution contains 9 grams of copper sulphate per litre, and wherein the water content of the solution is between 14 and 17%.

7. An electrolytic conductor for supplying electric current from a high-voltage direct-current source to a utilisation device, said conductor comprising a flexible tube containing a solution of a metal salt in a composition comprising a major proportion of glycerine, a plug sealing each end of said flexible tube, an electrode fitted into the inner end of each plug and consisting of the metal of said salt, and a longitudinally extending insert located in said flexible tube.

8. An electrolytic conductor according to claim 7, wherein the insert is a sealed tube containing a compressible medium.

9. An electrolytic conductor according to claim 7, wherein the insert is a solid core.

10. An electrolytic conductor for supplying electric current from a high-voltage direct-current source to a utilisation device, said conductor comprising a flexible tube containing a solution of a metal salt in a composition comprising a major proportion of glycerine, a plug sealing each end of said flexible tube, an electrode fitted into the inner end of each plug and consisting of the metal of said salt, and an insert extending along a portion of the length of the flexible tube, said insert consisting of glass fibre strands.

References Cited

UNITED STATES PATENTS

| | | | |
|---|---|---|---|
| 730,847 | 6/1903 | Van Gilder et al. | 174—9 |
| 2,589,448 | 3/1952 | Spence | 174—9 |
| 3,048,498 | 8/1962 | Juvinall et al. | 117—93.4 |

ALFRED L. LEAVITT, *Primary Examiner.*

J. H. NEWSOME, *Assistant Examiner.*